3,386,878
METHOD OF MAKING EXPANDED PLASTIC ARTICLES AND LAMINATES INVOLVED IN SUCH METHOD
Robert W. Pooley, Mishawaka, Ind., assignor to Uniroyal, Inc., a corporation of New Jersey
No Drawing. Filed June 18, 1964, Ser. No. 376,247
9 Claims. (Cl. 161—188)

ABSTRACT OF THE DISCLOSURE

Expanded ABS or other plastic is made by laminating (I) a first layer of plastic containing undecomposed blowing agent such as azodicarbonamide to (II) a second layer of plastic containing a migratory activator for the blowing agent such as zinc oxide. After lamination, the activator diffuses or migrates from layer (II) into layer (I) thereby lowering the temperature at which the laminate can be expanded by application of heat. The method increases the processing safety during compounding and lamination of the layers, since the blowing agent and activator are not present together in the same stock until subsequent to lamination.

---

This invention relates to a method of making chemically blown or expanded plastic articles, and more particularly it relates to a method of making such articles involving mixing one part of the plastic with a blowing agent and another part of the plastic with an activator for the blowing agent, bringing the two parts into contact, and blowing the assembly by the action of heat. The invention also relates to laminates of such plastic parts.

It is known to make blown or chemically expanded plastics by mixing the plastic with a blowing agent, that is, a chemical substance capable of liberating or generating gas or vapor or changing into gas or vapor at elevated temperature. Such mixing is accomplished at a temperature below the decomposition or volatilization temperature of the blowing agent. The mixture of plastic and undecomposed blowing agent is then shaped into a desired form, for example, into the form of a sheet, such shaping being accomplished at a temperature below the decomposition temperature of the blowing agent. After the plastic is in the desired form, the mixture is then heated to a temperature in excess of the decomposition temperature of the blowing agent, whereupon the plastic blows or expands, forming numerous voids or cells, which may be mainly open and intercommunicating or closed and non-intercommunicating, depending upon the exact materials used and the conditions of blowing. It will be understood that at the temperature of decomposition of the blowing agent the plastic mass is sufficiently soft and plastic to expand under the influence of the evolved gas, but at the same time it has sufficient strength to retain the expanded shape, rather than simply lose the gas and collapse. When cooled to room temperature, the blown plastic sheet or the like remains essentially permanently expanded, that is, it retains the cellular or spongy structure imparted by the process. Such expanded materials are particularly useful for making flotation equipment, insulating materials, boat hulls or parts thereof, doors or decks or other parts for automobiles or trucks, etc.; the usefulness of blown plastic sheets of this kind is enhanced by their ability to be vacuum drawn or similarly shaped into a desired form.

A serious limitation on carrying out methods of the kind described in commercial practice resides in the fact that certain plastic compositions having otherwise excellent physical properties require mixing temperatures which are dangerously close to the temperature at which the thermally unstable blowing chemicals decompose, so that there is always danger of premature liberation of gas, with consequent improper operation of the process. This is particularly true in the case of blowing agents used in the desirable manner in combination with chemicals which reduce the decomposition temperature of the blowing agent to the point where the blowing step can easily be carried out under factory processing conditions. Accordingly, a principal object of the invention is to increase the margin of safety while processing such expandable thermoplastic materials within the limitations imposed by practical factory operations.

The invention is directed particularly to providing means to improve the processing safety of thermoplastic stocks which require temperatures of the order of 280–320° F. to soften sufficiently to mix and process properly, yet because of subsequent equipment limitations, are required to laminate and expand at temperatures of approximately 300–320° F.

The expanded ABS plastics are good examples of this. It will be understood that the ABS plastics are thermoplastic materials based on acrylonitrile, butadiene and styrene. They may be physical mixtures of polymers, such as a blend of styrene-acrylonitrile resin with butadiene-acrylonitrile rubber, or they may be graft copolymers, such as graft copolymers of styrene and acrylonitrile on polybutadiene, or they may be mixtures of resins and/or rubbers with graft copolymers. Frequently the ABS polymer is employed in admixture with other resins, such as vinyl resins, especially polyvinyl chloride; if desired, other monomers such as alpha-methyl styrene, methacrylonitrile, ethyl acrylate, methyl methacrylate, and the like, may be substituted for some or all of the acrylonitrile or styrene. Such compositions are illustrated, for example, in U.S. Patents 3,041,220, Martin et al., June 26, 1962; 3,070,817, Kohrn et al., Jan. 1, 1963; 3,080,267, Schmalz, Mar. 5, 1963; 3,111,501, Thompson, Nov. 19, 1963; and 3,018,268, Daly, Jan. 23, 1962. In the typical practice of the present invention the selected ABS plastic composition is suitably compounded for processing at temperatures of about 280° F.–320° F., for example. The blowing agent is usually a nitrogen-releasing chemical, preferably azodicarbonamide, which is typically added to the plastic blend on an open mill, taking care to maintain the stock temperature as low as possible, consistent with efficient mixing.

It is interesting to note that if a suitable activating substance (for example, zinc oxide is a suitable activator when the blowing agent is azodicarbonamide) is incorporated in the plastic composition, it will cause the blowing agent to decompose and release gas at a temperature substantially below the normal decomposition temperature of the thermally unstable blowing agent. Thus, in the presence of the zinc oxide, the azodicarbonamide will decompose and release gas at approximately 300° F. Without the zinc oxide, the azodicarbonamide will decompose at about 350° F.

The suitable activators include the metal oxides and salts, notably oxides and salts of zinc, lead, cadmium, barium, and other metals; particularly suitable metal salts are those of inorganic acids such as phosphoric acid, organic acids such as fatty acids having 6–20 carbon atoms, metal salts of mercaptobenzothiazole, and the like. Examples in addition to zinc oxide are dibasic lead phosphite, litharge (PbO), zinc stearate, zinc salt of mercaptobenzothiazole, coprecipitated cadmium-barium laurate, cadmium 2-ethyl hexoate, etc. Other equivalent known activating substances may also be used, such as urea.

The foregoing and similar substances have in common the ability to activate the blowing agent (i.e., to lower its decomposition temperature) and they are capable of diffusing in the plastic stock; in fact, they are capable of diffusing or migrating out of one plastic stock into another adjacent plastic stock. The invention takes advantage of this "migrating" characteristic of the activators.

Although it is possible to laminate and expand the sheets of plastic material containing no activator, the higher expansion temperatures required impose other problems that make such practice undesirable in typical factory operations.

Unfortunately, the procedure of incorporating the activator and blowing agent together in the same plastic matrix gives rise to some serious processing difficulties because the required stock processing temperatures and the temperature of decomposition of the blowing agent are almost the same, as pointed out above. In accordance with the invention, two basic stocks are prepared, one containing the blowing agent but not the activator, and the other stock containing only the activator. These stocks are mixed and sheeted (calendered or extruded) separately and plied up in two or more alternate layers.

After the layers are brought together at least a portion of the activator diffuses or migrates out of the ply containing such activator and into the adjacent ply containing the blowing agent, in amount sufficient to activate the blowing agent, with the result that when the laminate is brought to the temperature of decomposition of the activated blowing agent, the desired liberation of gas will occur. Nevertheless, relatively high temperatures (e.g., 280–340° F.) are employable in the mixing and sheeting of the stocks without fear of premature decomposition of the blowing agent, because the stock containing the blowing agent does not contain the activator. In the stocks as mixed and initially formed into a sheet, the activator is contained only in the stock which has no blowing agent. Blowing agent and activator come together only after the stocks have been mixed and formed into separate sheets which are brought together, allowing the activator to migrate from one ply into the other. The mixing of the stocks can therefore be accomplished with complete processing safety by the method of the invention. The remarkable advantage of this technique is that the two separate stocks, containing the activator and the blowing agent respectively, can be processed safely at higher temperatures than can a single stock containing both components together. Subsequent to the lamination (or concurrently therewith if desired) the assembly is subjected to a temperature (e.g., 300–320° F.) sufficient to decompose the now-activated blowing agent, whereby the laminate expands to form the desired blown sheet or the like. It will be understood that the decomposition of the blowing agent is accomplished by this technique at a much lower temperature (e.g., 300–320° F.), because the activator has diffused into the stock containing the blowing agent, than would be possible if the activator were not present.

In practice, the actual expansion of the stock may be brought about in various ways. When the lamination of the various plies is carried out by pressing the sheets together at elevated temperature, for example in a press or in a vulcanizer, the temperature attained is frequently sufficient to decompose some or all of the blowing agent, although little or no actual expansion or blowing may take place at this stage because of the applied pressure. When such a laminate is cooled under pressure and released from pressure it usually assumes only a slightly expanded condition. Upon subsequent reheating to elevated temperature, for example in the course of a vacuum drawing operation, complete expansion takes place (either by reason of the gas present in largely dissolved state from the previous decomposition of at least some of the blowing agent and/or by reason of the gas released at this time by decomposition of any still undecomposed blowing agent). At other times, it may be convenient to laminate the plies under conditions that are so moderate that there is very little if any decomposition of the blowing agent, in which case the laminate as initially prepared undergoes little or no expansion. Subsequent forming at elevated temperature (e.g., vacuum drawing) causes decomposition of the blowing agent and expansion.

The invention may be used to advantage in making multi-component laminates comprising an expanded core sandwiched in between outer covering layers which are solid (which solid layers may if desired in turn be surfaced with protective or decorative skins) as described for example in 3,041,220, 3,070,817 or U.S. application Ser. No. 315,707, filed Oct. 11, 1963, now Patent No. 3,206,354. In such constructions the expandable core layer will advantageously be made up in the manner described in the present invention, i.e., of a plurality of plies some of which contain blowing agent but no activator and others of which contain activator but no blowing agent, arranged in alternating fashion. In the simplest case, the central layer would contain the blowing agent but no activator, while the outer covering layers would contain the activator but no blowing agent. However, in order to provide sections of greater thickness the central core may be made up of a number of layers instead of a single layer, in which case some of such layers may have blowing agent but no activator while others have activator but no blowing agent, these being of course alternately arranged. In this way the bulk of the core assembly is enabled to expand when desired and the activator is not required to diffuse or migrate through an undue thickness of stock since each of the core layers may be relatively thin while still providing in the aggregate a desired over-all thickness of core. In such a composite core, the plies formulated with blowing agent will ordinarily be made thicker (e.g., 2 to 5 or 10 times thicker) than the plies formulated with activator in order to obtain the desired thickness and low specific gravity in the core after expansion.

The following example, in which all quantities are expressed by weight, will serve to illustrate the practice of the invention in more detail.

EXAMPLE

The compositions employed in this example are as follows:

EXAMPLE

| Ingredients | I<br>Blowing Agent Mix | II<br>Activator Mix |
| --- | --- | --- |
| ABS Polymeric Material, parts | 100 | 100 |
| Stabilizer [tris(nonylated phenyl) phosphite] | 0.5 | 0.5 |
| Blue Pigment (optional) | | 1 |
| Zinc Oxide | | 1.5 |
| Blowing Agent (azodicarbonamide) | .2 | |
| Thickness of Ply (in.) | .025 | .005 |

The ABS polymeric material employed is made up of:

(A) 90 parts of a coprecipitated gum plastic blend of (a) acrylonitrile-styrene resin (containing 29% acrylonitrile and 71% styrene) with (b) a butadiene-acrylonitrile elastomeric high polymer (containing about 68% butadiene and 32% acrylonitrile) in the ratio of about 70% copolymer resin (a) and 30% elastomeric high polymre (b), and (B) 10 parts of additional butadiene-acrylonitrile copolymer rubber (containing approximately 35% acrylonitrile, 65% butadiene) mill mixed into the coprecipitated blend (A).

Part (A) of the ABS composition is blended with the stabilizer on a mill at 325° F., the extra butadiene-acrylonitrile copolymer rubber (B) is then added; the mix is blended well, and removed from the mill. This stabilized ABS mix is then divided into two separate portions which are used to compound the blowing agent mix (I) and the activator mix (II) shown above, on a mill. The stock temperature during the mixing of stocks (I) and (II) is 300–320° F. The mixes (I) and (II) are then separately calendered into sheets, with the calender rolls at a temperature of about 300° F. or the stocks may be extruded in sheet form, for example, at a temperature of about 340° F. (e.g., about 10 below the decomposition temperature of the blowing agent in the absence of activator).

Alternate plies of stocks (I) and (II) are laid up and pressed together, for example in a vulcanizing chamber, for 40 minutes at a temperature of about 307° F., to laminate the plies together. During this laminating operation, the activator, zinc oxide, diffuses out from the layers made of mix (II), into the layers made of mix (I) containing the blowing agent. During this operation at least some of the blowing agent usually decomposes but the laminate does not expand to any great extent at this point because it is confined under pressure. The laminate is cooled to a temperature at which it is rigid and form-sustaining, after which the pressure is released.
the separate layers still have essentially their original
Inspection of the laminate at this stage reveals that thicknesses; it is possible to distinguish the layers made of mix from the layers made of mix I because the layers made of mix II contain the blue pigment added for this purpose.

The laminate is then placed in a hot air oven where it is heated for 60 minutes at a temperature of 300° F. to cause expansion of the laminate.

Any remaining undecomposed blowing agent decomposes at this stage. The laminate expands typically to about 4 times its original thickness, and inspection of the edge of the laminate reveals that the expansion has taken place principally in the layers made of mix I, containing the blowing agent, whereas the blue colored layers made of mix II retain very nearly their original thickness. Slight diffusion of gases from the layers of mix (I) to the layers of mix (II) may occur, causing a slight increase in the thickness of the blue layers (II).

The resulting laminate can be further shaped into useful articles of various sorts, for example by conventional vacuum drawing techniques.

The foregoing example may be repeated using, in place of zinc oxide as activater, other equivalent activators such as dibasic lead phosphite, litharge, zinc stearate, zinc salt of mercaptobenzothiazole, coprecipitated cadmium-barium laurate, cadmium 2-ethyl hexoate, urea, or other activators. The amounts of activator employed is not critical and may vary considerably in particular instances. In some cases as little as 0.2–0.5 part (per 100 of ABS) may produce noticeable activating effect but it is more usual to employ slightly larger quantities, such as 1–2 or more parts. In fact relatively large quantities can be employed, e.g. 5 or 10 or more parts, especially if, as in the case of zinc oxide, the activator is also suitable for use as a pigment or filler.

In place of effecting the lamination of the sheets by superimposing calendered or extruded plies in a vulcanizer under heat and pressure as described in the above example, the sheets may be laminated by other methods, such as are described for example in Belgian Patent 615,880, United States Rubber Company, Apr. 2, 1962. In the latter case the duration of the heating in the laminating step is characteristically so brief that little or no decomposition of the blowing agent may take place during the laminating. Blowing is accomplished by subsequent heating of the laminate, for example during a vacuum shaping operation (diffusion of the activator takes place during such heating).

It will be understood that the laminated material of the invention is in itself an article of commerce that may be sold as such, even in the unblown or incompletely blown state, for example to fabricators of particular shaped articles who would carry out the blowing or complete the blowing by heating, conveniently at the same time that the laminate is being given the desired final shape. In this aspect, one form of the invention comprises a laminate having one or more plies of plastic compounded with activator but devoid of blowing agent, alternating with one or more thicker plies of plastic compounded with blowing agent but no activator. The intermediate laminate as sold to a fabricator of final articles may (depending on the particular conditions under which the laminate was assembled) contain the blowing agent in an undecomposed state, or in a decomposed state (partly decomposed or fully decomposed) in which case partial expansion also will usually have taken place. Either of these intermediate forms of the laminate are of course capable of fully expanding upon application of heat by the fabricator of final articles. In the case of the intermediate form of laminate (made under mild or brief heating conditions of lamination) containing the undecomposed blowing agent, the gas is of course generated during such final heating, with resulting expansion. In the case of the intermediate form of laminate (made under more severe or prolonged heating conditions of lamination) containing blowing agent at least partly decomposed at least some of the gas is already present either in dissolved form or in the form of minute bubbles under pressure and the final heating step causes dissolved gas to come out of solution and expand the soft, heated plastic or causes small gas bubbles already present to expand (and also causes any undecomposed blowing agent to decompose). Diffusion or migration of the activator from one ply into another takes place mostly rapidly at elevated temperature. Where the laminating temperature conditions are severe or prolonged, diffusion of activator takes place during lamination. Where the laminating temperature conditions are mild or brief, diffusion of activator takes place in the final heating (expansion) step.

It will be understood that various known expandable plastics and various conventional blowing agents may be employed in the present invention. In any particular case those skilled in the art will be able to select operating conditions suitable to the particular compositions employed. The preferred blowing agents, as is well known, are ordinarily organic chemicals which decompose to liberate nitrogen or similar inert gas (see Modern Plastics Encyclopedia, issue 1956, pages 351–2). In addition to the preferred azodicarbonamide type of blowing agent there may be mentioned those of the p,p'-oxybis(benzenesulfonyl hydrazide) type or the p-toluene sulfonyl semicarbazide type as disclosed in British patent 896,597, United States Rubber Company, November 30, 1960. The latter type is particularly preferred for use at relatively high processing and blowing temperatures.

Having thus described my invention, what I claim and desire to protect by Letters Patent is:

1. A method of making an expanded plastic article comprising preparing two separate plastic mixes, one of which contains a chemical blowing agent but is devoid of an activator for the blowing agent and the other of which contains an activator for the blowing agent but is devoid of blowing agent, the two mixes being prepared at temperatures below the decomposition temperature of the blowing agent in the absence of activator but above the decomposition temperature of the blowing agent in the presence of activator, bringing the two mixes into contact in a desired shape, and heating the resulting assembly to an elevated temperature whereby the activator diffuses from the mix which initially contained activator into the mix containing the blowing agent, the said last mentioned temperature being above the temperature at which the blowing agent decomposes in the presence of the activator but below the temperature at which the blowing agent decomposes in the absence of the activator, whereby the said assembly expands.

2. A method of making an expended ABS plastic assembly comprising preparing two separate ABS plastic mixes, one of which contains azodicarbonamide but is devoid of an activator for the decomposition of azodicarbonamide and the other of which contains zinc oxide but is devoid of blowing agent, the two mixes being prepared at temperatures within the range 280–320° F., forming the mixes into sheets, plying the sheet together in such manner that the mixes alternate in the resulting laminate, and heating the laminate to a temperature of 300–320° F. whereby the sheets compounded with the azodicarbonamide, into which the zinc oxide diffuses, become expanded.

3. A method of activating a nitrogen-releasing organic chemical blowing agent, the decomposition temperature of which is lowered in the presence of a migratory activator selected from the group consisting of zinc oxide, dibasic lead phosphite, litharge, zinc stearate, zinc salt of mercaptobenzothiazole, coprecipitated cadminum-barium laurate, cadmium 2-ethyl hexoate and urea, in an ABS plastic composition comprising placing in contact with said composition another ABS composition containing said migratory activator whereby the activator diffuses into the ABS composition containing the blowing agent.

4. In a method of making an expanded sheet from a plastic containing a thermally unstable blowing agent and an activator which lowers the temperature of the decomposition of the blowing agent, the improvement comprising initially mixing the plastic with the blowing agent and thereafter forming the sheet in the absence of the activator, placing the sheet in contact with another sheet of the plastic previosuly mixed with the activator but devoid of blowing agent, whereby the activator diffuses out of the second-mentioned sheet into the first-mentioned sheet.

5. A method of making an expanded ABS plastic laminate comprising mixing one portion of the ABS plastic at a temperature in the range 280–320° F. with azodicarbonamide in the absence of an activator for the decomposition of the azodicarbonamide, separately mixing another portion of ABS plastic with an activator for the decomposition of azodicarbonamide selected from the group consisting of metal oxide activators, metal salt activators, and urea, in the absence of azodicarbonamide, separately shaping the two portions into sheets, plying a plurality of the sheets together to make a laminate in such manner that layers containing azodicarbonamide alternate with layers containing activator, heating the laminate under pressure to a temperature of 300–320° F. whereby the activator diffuses into the layers containing azodicarbonamide and the azodicarbonamide decomposes at least partially cooling the laminate to a form-sustaining state while under pressure, releasing the pressure, and thereafter reheating the laminate to a temperature at which it is soft and formable whereby the laminate expands.

6. A method of making an expanded ABS plastic laminate comprising mixing one portion of the ABS plastic at a temperature in the range 280–320° F. with azodicarbonamide in the absence of an activator for the decomposition of the azodicarbonamide, separately mixing another portion of ABS with an activator for the decomposition of azodicarbonamide selected from the group consisting of metal oxide activators, metal salt activators and urea, in the absence of azodicarbonamide, shaping the two portions into separate sheets, plying a plurality of the sheets together to make a laminate having layers containing azodicarbonamide alternating with layers containing activator, and heating the resulting laminate to a temperautre of 300–320° F. whereby the activator diffuses into the layers containing the azodicarbonamide and the laminate expands.

7. A laminate suitable for shaping and expansion at elevated temperatures comprising ABS plastic layers compounded with azodicarbonamide in the absence of activator laminated to ABS plastic layers devoid of blowing agent containing activator, the said first-mentioned layers containing activator diffused thereinto from said second-mentioned layers, the azodicarbonamide being at least partially decomposed and the first-mentioned layers being partially expanded.

8. A laminate suitable for shaping and expansion at elevated temperatures comprising ABS plastic layers containing an undecomposed nitrogen-releasing organic chemical blowing agent, said layers being devoid of activator for the blowing agent, said layers alternating with different contacting layers of ABS plastic devoid of blowing agent and containing a migratory activator for the said blowing agent selected from the group consisting of metal oxide activators, metal salt activators and urea.

9. A expanded, shaped laminate comprising alternating expanded and substantially unexpanded layers of ABS plastic, the expanded layers containing decomposed azodicarbonamide and containing, as the sole activator, a migratory activator diffused into said expanded layers from adjacent substantially unexpanded layers containing no azodicarbonamide but containing the said activator.

References Cited
UNITED STATES PATENTS

| | | | |
|---|---|---|---|
| 2,495,175 | 1/1950 | Nagel | 156—310 |
| 2,746,898 | 5/1956 | Buckwalter et al. | 156—310 X |
| 2,817,620 | 12/1957 | Golick et al. | 156—310 X |
| 3,128,262 | 4/1964 | Lightfoot | 264—41 |
| 3,179,143 | 4/1965 | Schultz et al. | 156—310 X |
| 3,211,814 | 10/1965 | Kohrn et al. | 156—79 X |
| 3,213,071 | 10/1965 | Campbell | 260—88.2 |
| 3,262,805 | 7/1966 | Aoki | 156—79 X |
| 3,294,602 | 12/1966 | Francis et al. | 264—54 |

EARL M. BERGERT, *Primary Examiner.*

HAROLD ANSHER, *Examiner.*